(12) United States Patent
Choi et al.

(10) Patent No.: US 8,875,151 B2
(45) Date of Patent: Oct. 28, 2014

(54) LOAD BALANCING METHOD AND APPARATUS IN SYMMETRIC MULTI-PROCESSOR SYSTEM

(75) Inventors: Gyu-sang Choi, Seoul (KR); Chae-seok Im, Suwon-si (KR); Si-hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1492 days.

(21) Appl. No.: 11/976,759

(22) Filed: Oct. 26, 2007

(65) Prior Publication Data

US 2009/0019449 A1 Jan. 15, 2009

(30) Foreign Application Priority Data

Jul. 10, 2007 (KR) .................. 10-2007-0069353

(51) Int. Cl.
*G06F 9/46* (2006.01)
*G06F 9/50* (2006.01)

(52) U.S. Cl.
CPC .................. *G06F 9/5088* (2013.01)
USPC .................. 718/105

(58) Field of Classification Search
None
See application file for complete search history.

(56) References Cited

U.S. PATENT DOCUMENTS

| 5,459,864 | A | * | 10/1995 | Brent et al. | 718/105 |
| 5,745,778 | A | * | 4/1998 | Alfieri | 712/1 |
| 7,080,379 | B2 | | 7/2006 | Brenner et al. | |
| 7,316,017 | B1 | * | 1/2008 | Jacobson et al. | 718/102 |
| 2003/0212731 | A1 | * | 11/2003 | Brenner et al. | 709/105 |
| 2007/0083871 | A1 | * | 4/2007 | McKenney | 718/105 |
| 2007/0214456 | A1 | * | 9/2007 | Casey et al. | 718/100 |

FOREIGN PATENT DOCUMENTS

| KR | 10-2006-0101155 | 9/2006 |
| KR | 10-2006-0132852 | 12/2006 |

OTHER PUBLICATIONS

Eric Piel, ARTiS(an Asymmetric Real-Time Scheduler for Linux on Multi-Processor Architectures), Nov. 2005, INRIA in France, 32 pages.*
Efkemann, C., Development and evaluation of a hard real-time scheduling modification for Linux 2.6, University of Bremen, Germany, Dec. 12, 2005 (125 pp).
Manimaran, G. et al., Integrated Scheduling of Tasks and Messages in Distributed Real-time Systems, IEEE, Apr. 3, 1997 (8 pp).
Office Action dated Nov. 13, 2008 in corresponding Korean Patent Application No. 10-2007-0069353.

* cited by examiner

*Primary Examiner* — Emerson Puente
*Assistant Examiner* — Sisley Kim
(74) *Attorney, Agent, or Firm* — Staas & Halsey LLP

(57) ABSTRACT

Provided are a load balancing method and a load balancing apparatus in a symmetric multi-processor system. The load balancing method includes selecting at least two processors based on a load between a plurality of processors, from among the plurality of processors, migrating a predetermined task stored in a run queue of a first processor to a migration queue of a second processor, and migrating the predetermined task stored in the migration queue of the second processor to a run queue of the second processor. Accordingly, a run queue of a processor is not blocked while migrating a task, an immediate response of the run queue is possible, and a waiting time of a scheduler is reduced. Consequently, the scheduler can speedily perform context switching, and thus performance of the entire operating system is improved.

16 Claims, 9 Drawing Sheets

LOAD BALANCING METHOD AND APPARATUS IN SYMMETRIC MULTI-PROCESSOR SYSTEM

CROSS-REFERENCE TO RELATED PATENT APPLICATION

This application claims the benefit of Korean Patent Application No. 10-2007-0069353, filed on Jul. 10, 2007, in the Korean Intellectual Property Office, the disclosure of which is incorporated herein in its entirety by reference.

BACKGROUND OF THE INVENTION

1. Field of the Invention

The present invention relates to a load balancing method and apparatus in a symmetric multi-processor system, and more particularly, to a method and apparatus, in which an operating system migrates tasks from a current processor to another processor for load balancing in a symmetric multi-processor system.

2. Description of the Related Art

In processor architecture, a plurality of processors are loaded on one chip, and thus a plurality of tasks can be simultaneously performed. However, performance of a system cannot be proportionally improved by increasing the number of processors due to load imbalance, where tasks are not equally distributed and performed in all processors but instead, more tasks are assigned to a predetermined processor. Accordingly in order to solve such a problem, load balancing is required, where the balance of tasks assigned to each processor is adjusted by migrating tasks from a processor having a heavy load to another processor having a relatively light load.

FIG. 1 is a diagram illustrating a load balancing apparatus in a conventional symmetric multi-processor system, where two central processing units (CPUs) 110 and 120 are illustrated for convenience. The CPUs respectively include run queues 111 and 121, where tasks to be performed are stored. In FIG. 1, load balancing processes are achieved by a migration process 130, where tasks from the run queue 111 of the CPU 110, which has a heavy load with 5 tasks, to the run queue 121 of the CPU 120, which has a relatively light load with 2 tasks. In the migration process 130, a lock of the run queue 111, in which a current task is stored, is acquired first, and then a lock of the run queue 121, where the current task is to be migrated, is acquired. Here, a lock denotes an exclusive authority that disables a process from using a queue when another process is using the queue.

The reason for acquiring the locks and migrating the tasks in the run queues 111 and 121 is that integrity of the run queues 111 and 121 may be broken while adding or deleting a task in the run queues 111 and 121 while migrating the tasks, unless the locks of the run queues 111 and 121 are not acquired. When the integrity of the run queues 111 and 121 is broken, a certain task may be excluded from the run queues 111 and 121, and not be scheduled permanently. Also, the structure of the run queues 111 and 121 can be corrupted, and thus an operating system may crash. Such run queues 111 and 121 are objects having a mutual exclusion characteristic, where simultaneous use of one resource by a plurality of tasks is excluded, such as mutexes (mutual exclusion objects) or semaphores. In a mutex, a resource which can only be used by one task is expressed as a critical section. Accordingly, after migrating a task, the locks of the run queues 111 and 121 should be released so that other tasks can use the run queues 111 and 121. Acquiring and releasing a lock are performed as a pair, because when a lock for a certain task is not released after acquiring the lock, other tasks should wait endlessly. By simultaneously acquiring the locks of the run queues 111 and 121, the time taken to perform tasks is delayed, and as a result, performance of the operating system deteriorates.

FIG. 2 is a flowchart illustrating a load balancing method in a conventional symmetric multi-processor system. First, it is determined whether a load imbalance occurred in operation 201. If the load imbalance has occurred, a first CPU in which the load imbalance occurred, a second CPU, and a task that is to be migrated are selected in operation 202. An attempt is made to acquire a lock of a run queue of the first CPU in operation 203, and if the lock of the run queue of the first CPU is not acquired, the symmetric multi-processor system waits until it is acquired. If the lock of the run queue of the first CPU is acquired, operation 204 is performed. Similar to operation 203, an attempt is made to acquire a lock of a run queue of the second CPU in operation 204. If the locks of the run queues of the first and second CPUs are acquired, the task is migrated from the run queue of the first CPU to the run queue of the second CPU in operation 205. In operations 206 and 207, the locks of the run queues of the first and second CPUs are released.

FIG. 3 is a flowchart illustrating a method of scheduling load balancing in a conventional symmetric multi-processor system. In operation 301, a scheduler tries to acquire a lock of a run queue of a second CPU, and if the lock is not acquired, the scheduler waits until it is acquired. If the lock is acquired, a task to be performed next is selected according to a scheduling policy in operation 302. In operation 303, the lock of the run queue of the second CPU is released, and in operation 304, context switching, which involves switching a task that is currently being performed to the selected task, is performed.

The load balancing method in the conventional symmetric multi-processor system has been described with reference to FIGS. 2 and 3. Now, problems of the load balancing method will be described with reference to FIG. 4.

FIG. 4 is a diagram illustrating a sequence of performing tasks according to time while migrating the tasks in a conventional symmetric multi-processor system, and shows a scheduling delay due to a lock, as described above. Referring to FIG. 4, it is assumed that a task 410, a task 420, and a task 430 are respectively assigned to a CPU 1, a CPU 2, and a CPU 3, wherein a load of the task 430 is the lightest. When load imbalance occurs as assumed above, a scheduler determines to migrate the task 410 from the CPU 1 to the CPU 3. First, a lock of a run queue of the CPU 1, in which the task 410 is stored, is acquired, and then a lock of a run queue of the CPU 3, where the task 410 is to be migrated to, is acquired. At this time, the scheduler determines to migrate the task 420 from the CPU 2 to the CPU 3. Thus similarly, a lock of a run queue of the CPU 2, in which the task 420 is stored, is acquired, and then the lock of the run queue of the CPU 3, where the task 420 is to be migrated to, is acquired. However, the lock of the run queue of the CPU 3 has already been acquired by the task 410, at the time the task 420 requests to acquire the lock of the run queue of the CPU 3. Accordingly, the task 420 should wait in operation 440 until the lock of the run queue of the CPU 3 is released, and the lock of the run queue of the CPU 3 is again acquired for the task 420 after the lock of the run queue of the CPU 3 for the task 410 is released.

Meanwhile, when the scheduler schedules the task 430 of the run queue of the CPU 3, the lock of the run queue of the CPU 3 is already acquired for the tasks 410 and 420, and thus the task 430 should wait in operation 450 until the lock of the run queue of the CPU 3 is released. After the lock for the task 420 is released, the lock for the task 430 is acquired, and thus the task 430 is scheduled. Thus, in the load balancing method in a conventional multi-processor system, the scheduler waits for a long time due to contention to preoccupy a run queue, that is, contention to acquire a lock of a run queue. Accordingly, performance of the multi-processor system deteriorates, and response time of each task is remarkably delayed. Specifically, such a delay in the response time has a negative impact on guaranteeing of an immediate response in a real-time operating system, such as an embedded system.

SUMMARY OF THE INVENTION

The present invention provides a load balancing method and a load balancing apparatus, which prevents a delay in response time of each of a plurality of tasks that occur by blocking a run queue of a processor by migrating a task when load imbalance occurs in a multi-processor system, and solves a problem of a long waiting time of a scheduler due to the delay in response time and poor performance of the entire operating system.

According to an aspect of the present invention, there is provided a load balancing method, including: (a) selecting at least two processors based on a load between a plurality of processors; (b) migrating a predetermined task stored in a run queue of a first processor to a migration queue of a second processor, from among the selected processors; and (c) migrating the predetermined task stored in the migration queue of the second processor to a run queue of the second processor.

According to another aspect of the present invention, there is provided a computer readable recording medium having recorded thereon a program for executing the method of above.

According to another aspect of the present invention, there is provided a symmetric multi-processor system, including: a plurality of processors; a scheduler, which selects at least two processors based on loads of the plurality of processors; a run queue of a first processor from among the selected two processors, which stores tasks to be performed by the first processor; a run queue of a second processor, from among the selected two processors, which stores tasks to be performed by the second processor; and a migration queue of the second processor, which stores tasks migrated from the run queue of a processor other than the second processor, wherein the scheduler migrates a predetermined task stored in the run queue of the first processor to the migration queue of the second processor, and migrates the task stored in the migration queue of the second processor to the run queue of the second processor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 5:
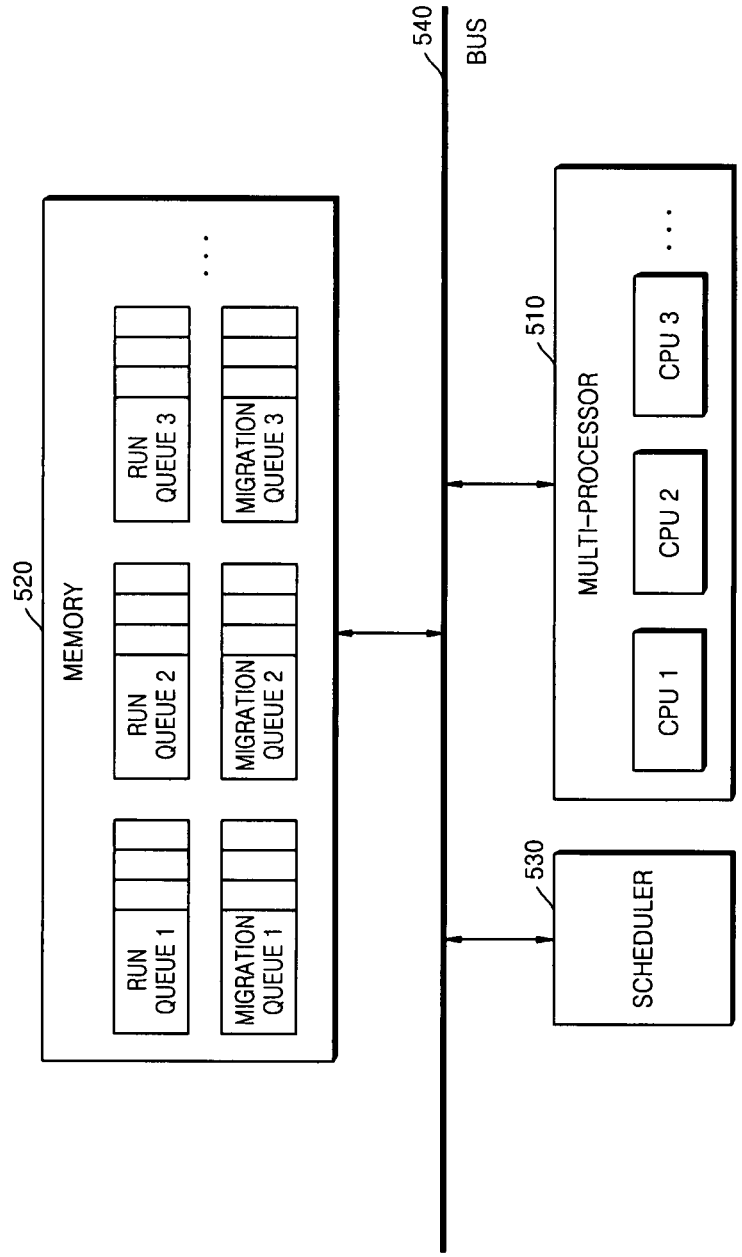
FIG. 5 is a diagram illustrating a symmetric multi-processor system according to an embodiment of the present invention.

FIG. 5 is a diagram illustrating a symmetric multi-processor system according to an embodiment of the present invention.

Referring to FIG. 5, the symmetric multi-processor system according to the current embodiment of the present invention includes a multi-processor 510, a memory 520, a scheduler 530, and a bus 540. The symmetric multi-processor system illustrated in FIG. 5 is the simplest drawing for describing the current embodiment, and it will be obvious to one of ordinary skill in the art that other elements can be included, such as a disc device and input/output device. Also, FIG. 5 is a conceptual diagram illustrating the elements according to their functions, and thus may differ from a physical hardware configuration.

The multi-processor 510 includes a plurality of central processing units (CPUs) performing tasks stored in the memory 520. The memory 520 is an operating space for the CPUs to process the tasks, and is loaded with various programs and tasks of an operating system. Also, the memory 520 includes run queues, in which tasks to be performed by the CPUs are stored correspondingly to each CPU. In the current embodiment, one run queue corresponds to one CPU. Moreover, the memory 520 includes migration queues corresponding to each of the run queues. Unlike conventional load balancing, where a task directly moved from a source run queue to a target run queue, a migration queue is a queue which stores a task that is migrating from the source run queue. In other words, the migration queue migrates and stores a task from a run queue of a CPU other than its own CPU. For example, in FIG. 5, when a CPU 1 corresponds to a run queue 1 and a migration queue 1, and a CPU 2 corresponds to a run queue 2 and a migration queue 2, the migration queue 1 can migrate and store a task from the run queue 2 of the CPU 2 or a run queue 3 of a CPU 3, instead of the CPU 1.

The scheduler 530 schedules various tasks of the symmetric multi-processor system and supplies the scheduled tasks to resources that require tasks. Generally, a scheduler means a CPU scheduler, which assigns tasks stored in run queues of a memory to a corresponding CPU according to a predetermined scheduling policy, or a task scheduler, which loads required programs in the memory 520 from a storage device, such as a disc device (not shown). In the current embodiment, a CPU scheduler is described, and it is referred to as a scheduler for convenience. The scheduler 530 according to the current embodiment of the present invention migrates a task from a run queue of a predetermined CPU to a migration queue of another CPU through the bus 540 when a load imbalance occurs in the symmetric multi-processor system. Also, the scheduler 530 selects tasks stored in run queues according to a predetermined scheduling policy and assigns the tasks in CPUs. Regarding the predetermined scheduling policy, various scheduling methods supported in a general operating system are well known, such as a scheduling policy according to priority, and thus details thereof will be omitted herein.

Assigning a task to a CPU, acquiring a lock of a run queue, releasing the lock, and migrating a task in an operating system are performed by the scheduler 530, and accordingly, it is well known to one of ordinary skill in the art that operations described herein are performed by the scheduler 530, even if a subject of performing the operations is not specifically mentioned. Also, a migration queue is also a type of queue managed by the memory 520, and thus a lock of the migration queue is acquired and released by the scheduler 530, and a task is stored or migrated in the migration queue by the scheduler 530.

Figure 6:
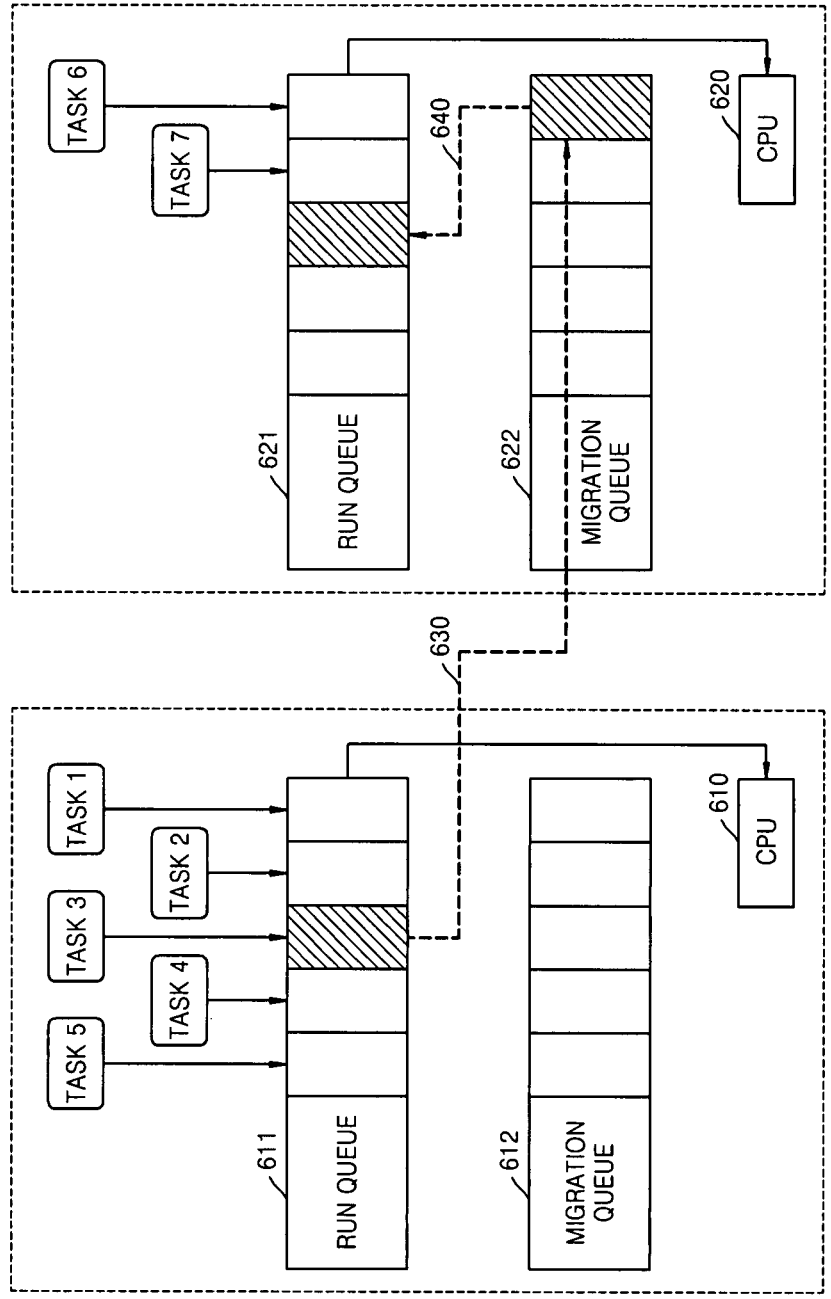
FIG. 6 is a diagram illustrating a load balancing apparatus using a migration queue in a symmetric multi-processor system according to an embodiment of the present invention.

FIG. 6 is a diagram illustrating a load balancing apparatus using a migration queue in a symmetric multi-processor system according to an embodiment of the present invention. For convenience, two CPUs 610 and 620 are illustrated. The CPUs 610 and 620 respectively include run queues 611 and 621, in which a task to be performed, and migration queues 612 and 622, which respectively correspond to the run queues 611 and 621.

Figure 1:
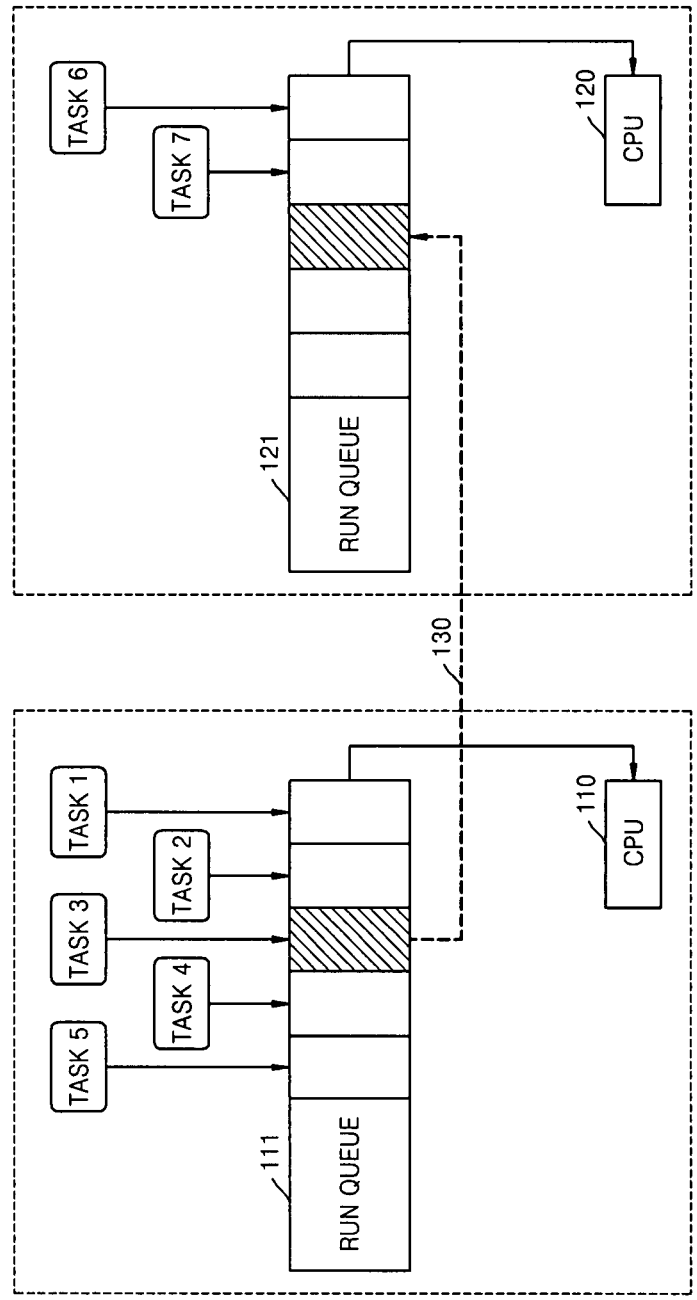
FIG. 1 is a diagram illustrating a load balancing apparatus in a conventional symmetric multi-processor system.
Figure 2:
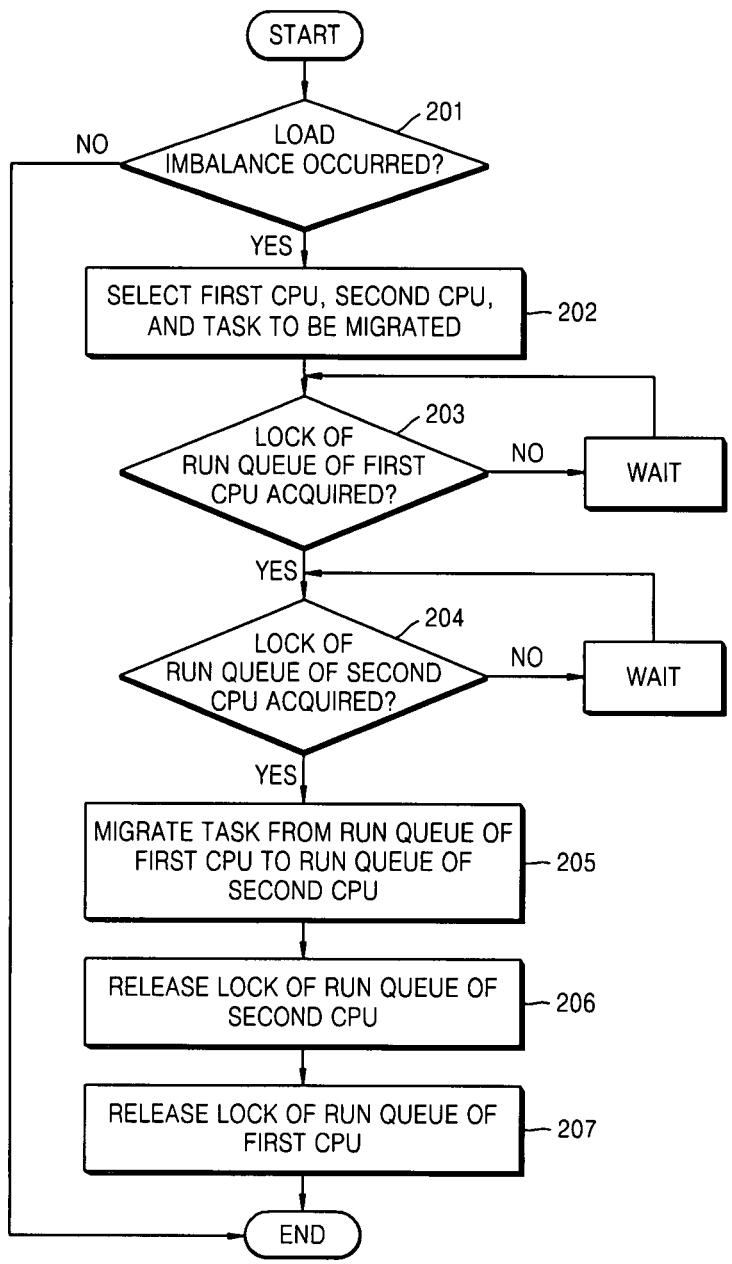
FIG. 2 is a flowchart illustrating a load balancing method in a conventional symmetric multi-processor system.

Referring to FIG. 6, load balancing processes are achieved by a migration process 630, where tasks from a run queue 611 of the CPU 610, which has a heavy load with 5 tasks, to a migration queue 622 of the CPU 620, which has a relatively light load with 2 tasks. Here, run queues 611 and 621, and migration queues 612 and 622 may be objects having a mutual exclusion characteristic, where simultaneous use of one resource by a plurality of tasks is excluded, such as mutexes described above with reference to FIG. 1. Accordingly, similar to FIG. 1, locks of two queues, which are a starting point and an arriving point related to migrating a task, should be acquired and released. In other words, before migrating a predetermined task, the locks of the queues are acquired, and after the task is migrated, the locks of the queues are released in order to guarantee integrity of the queues.

Figure 3:
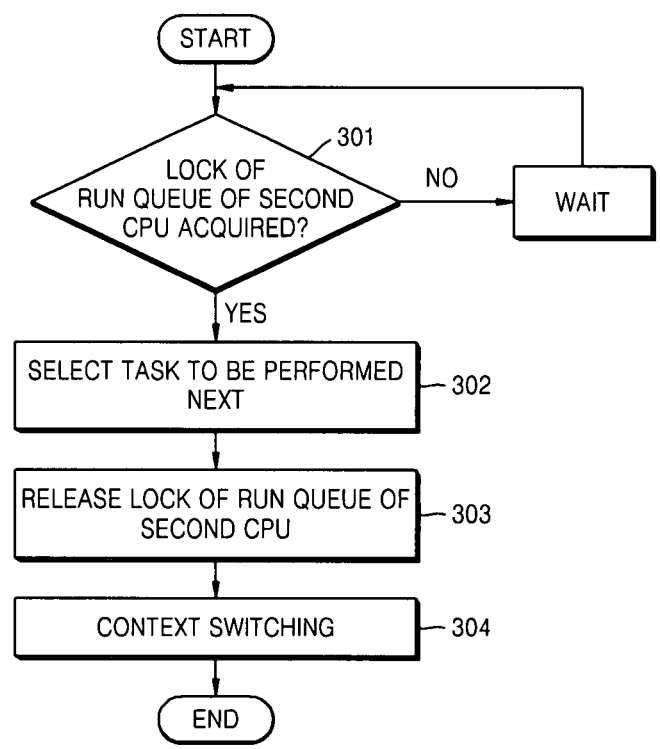
FIG. 3 is a flowchart illustrating a method of scheduling load balancing in a conventional symmetric multi-processor system.

Detailed processes of acquiring and releasing a lock will now be described with reference to FIG. 3. First, locks of the run queue 611 of the CPU 610 and the migration queue 622 of the CPU 620 are acquired, a task 3 is migrated from the run queue 611 of the CPU 610 to the migration queue 622 of the CPU 620 in the migration process 630, and finally, the locks of the run queue 611 of the CPU 610 and the migration queue 622 of the CPU 620 are released.

In the above processes, the task 3 stored in the migration queue 622 of the CPU 620 has only been migrated, and is not performed by the CPU 620. Only when the task 3, stored in the migration queue 622, is transmitted to the run queue 621, which corresponds to the migration queue 622, can the task 3 be scheduled by a scheduler. Accordingly, a migration process 640, wherein the task 3, stored in the migration queue 622, is migrated to the run queue 621 is required, and locks of the migration queue 622 and the run queue 621 are acquired and released, like in the migration process 630. In detail, first, the locks of the migration queue 622 and the run queue 621 of the CPU 620 are acquired, the task 3 is migrated from the migration queue 622 to the run queue 621 in the migration process 640, and finally, the locks of the migration queue 622 and the run queue 621 of the CPU 620 are released.

Meanwhile, when a task is migrated from a migration queue to a run queue in the same CPU, such as in the migration process 640, a problem of mutual exclusion should be solved in case the scheduler is going to schedule the run queue 621 of the CPU 620 in order to perform a task in the CPU 620. That is, when a scheduling process of migrating the task 3 to the run queue 621 of the CPU 620 and a scheduling process of assigning a task to the CPU 620 contend in order to occupy a resource (the run queue 621 of the CPU 620), wait and delay of the scheduling processes should be adjusted.

Accordingly, before migrating the task 3 from the migration queue 622 to the run queue 621, it may be checked whether the scheduler can acquire permission to use the migration queue 622. If the scheduler cannot acquire permission, the scheduler may wait until the migration queue 622 is not used by another scheduling process or a task, or may not wait.

If the scheduler does not wait, the scheduler may migrate the task 3 from the migration queue 622 to the run queue 621 during a following scheduling process when the migration queue 622 is not used. In other words, the scheduler does not migrate the task 3 from the migration queue 622 to the run queue 621 but instead, only schedules the run queue 621. Here, it can be checked whether the migration queue 622 is being used by checking whether the lock of the migration queue 622 is acquired by another scheduling process or to perform another task. Since the scheduler is executed periodically according to a predetermined policy or when the scheduler satisfies a certain condition, the scheduler migrates a predetermined task when the scheduler can use the migration queue 622. Accordingly, the scheduler does not wait for the migration queue 622, and thus a delay in scheduling the run queue 621 can be prevented.

Figure 7:
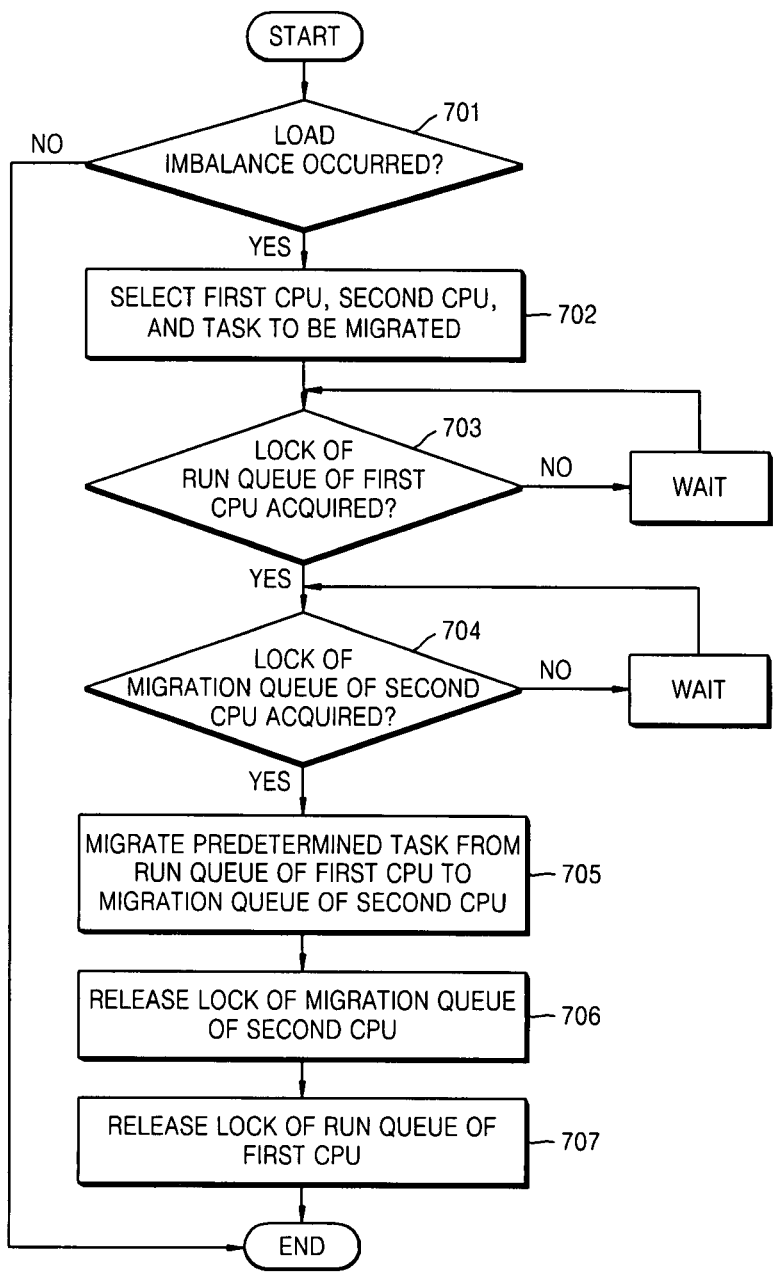
FIG. 7 is a flowchart illustrating a load balancing method using a migration queue in a symmetric multi-processor system according to an embodiment of the present invention.

FIG. 7 is a flowchart illustrating a load balancing method using a migration queue in a symmetric multi-processor system according to an embodiment of the present invention.

According to the load balancing method, a scheduler checks whether a load imbalance has occurred in operation 701. If the load imbalance has not occurred, the load balancing method ends, but if the load imbalance has occurred, operation 702 is performed.

In operation 702, the scheduler selects a first CPU, a second CPU, and a task to be migrated. In other words, target CPUs and a task to be migrated are selected in order to distribute the task from a CPU, which has a heavy load with numerous tasks stored in a run queue, to another CPU, which has a light load with few tasks.

The scheduler tries to acquire a lock of a run queue of the first CPU in operation 703. If the lock of the run queue of the first CPU is not acquired because the run queue of the first CPU is occupied by another scheduling process, the scheduler waits until the lock of the run queue of the first CPU is released. Similarly, the scheduler tries to acquire a lock of a migration queue of the second CPU in operation 704. If the lock of the migration queue of the second CPU is not acquired, the scheduler waits until it is released. If both locks are acquired, operation 705 is performed.

The scheduler migrates a predetermined task from the run queue of the first CPU to the migration queue of the second CPU in operation 705, and releases the locks of the migration queue of the second CPU and of the run queue of the first CPU respectively in operations 706 and 707. The operations of the load balancing method are equal to the load balancing processes described above with reference to FIG. 6, and thus detailed descriptions thereof will be omitted here.

Figure 8:
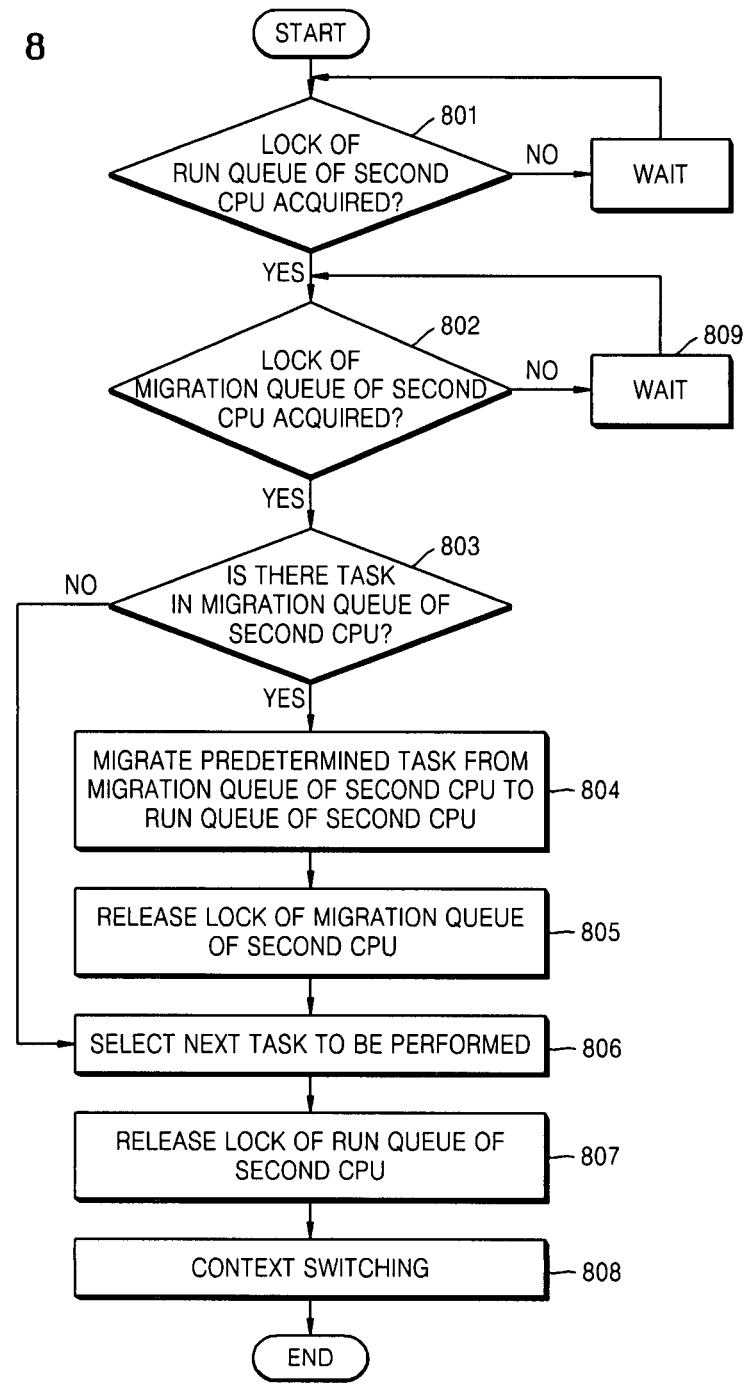
FIG. 8 is a flowchart illustrating a method of scheduling load balancing by using a migration queue in a symmetric multi-processor system according to an embodiment of the present invention.

Meanwhile, the scheduler can perform scheduling while migrating a task between CPUs. FIG. 8 is a flowchart illustrating a method of scheduling load balancing by using a migration queue in a symmetric multi-processor system according to an embodiment of the present invention.

The scheduler tries to acquire a lock of a run queue of a second CPU in operation 801. If the lock of the run queue of the second CPU is not acquired since the run queue of the second CPU is already occupied by another scheduling process, the scheduler waits until the lock of the run queue of the second CPU is released. If the lock of the run queue of the second CPU is acquired, operation 802 is performed.

The scheduler tries to acquire a lock of a migration queue of the second CPU in operation 802. If the lock of the migration queue of the second CPU is not acquired, the scheduler waits in operation 809 until it is released. If the lock of the migration queue of the second CPU is acquired, operation 803 is performed.

Meanwhile, regarding operation 809, it is assumed that a process of migrating the task from the migration queue of the second CPU to the run queue of the second CPU and a process of scheduling the run queue of the second CPU in order to execute the task in the second CPU contend. In this case, as described in FIG. 6, it can be checked whether the lock of the migration queue of the second CPU has already been acquired. If the migration queue of the second CPU is re-occupied, the scheduler can wait until the lock of the migration queue of the second CPU is released (operation 809), or as described in FIG. 6, the scheduler may schedule the run queue of the second CPU without standing by. If the scheduler does not wait, the scheduler checks again whether the lock of the migration queue of the second CPU is acquired in a following scheduling process, and if the lock of the migration queue of the second CPU is not acquired, operation 803 is performed. Accordingly, a delay in scheduling the run queue of the second CPU, that may occur due to contention of the run queue of the second CPU, can be avoided.

The scheduler checks whether there is a task in the migration queue of the second CPU in operation 803. If there is no task in the migration queue of the second CPU, operation 806 is performed in order to schedule the run queue of the second CPU, without migrating a task from the migration queue to the run queue of the second CPU. If there is a task in the migration queue of the second CPU, operation 804 is performed in order to migrate the task.

The scheduler migrates the predetermined task from the migration queue of the second CPU to the run queue of the second CPU in operation 804. The lock of the migration queue of the second CPU is released in operation 805, a next task to be performed is selected in operation 806, and the lock of the run queue of the second CPU is released in operation 807. Finally, context switching for the task stored in the run queue of the second CPU is performed in operation 808, and the second CPU performs the switched task.

Figure 9:
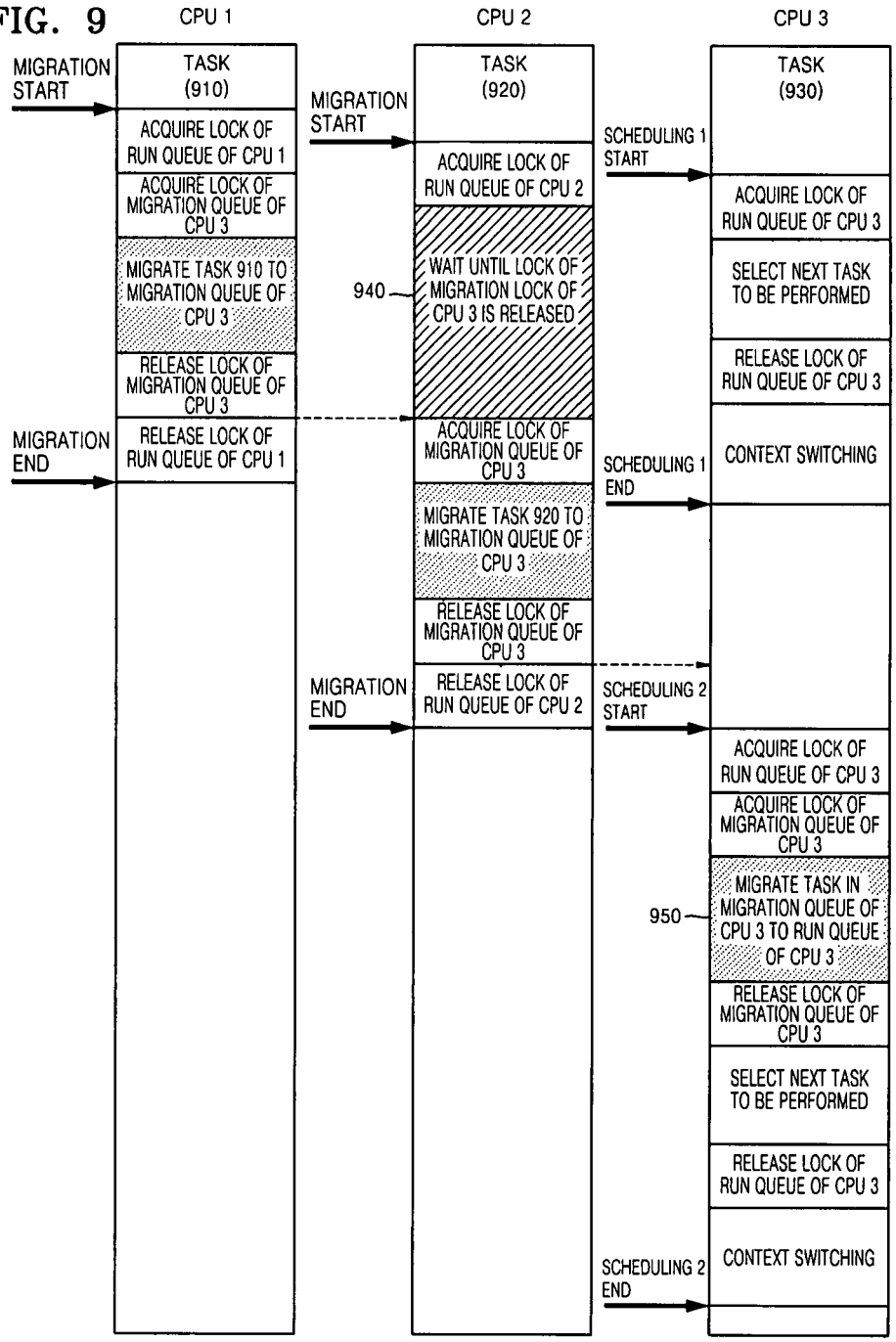
FIG. 9 is a diagram illustrating a sequence of performing tasks according to time while migrating the tasks by using a migration queue in a symmetric multi-processor system according to an embodiment of the present invention.

FIG. 9 is a diagram illustrating a sequence of performing tasks according to time while migrating the tasks by using a migration queue in a symmetric multi-processor system according to an embodiment of the present invention. Similarly to FIG. 4, it is assumed that a task 910, a task 920, and a task 930 are respectively assigned to a CPU 1, a CPU 2, and a CPU 3, wherein the task 930 has the lightest load.

As assumed above, if the load imbalance occurs, the scheduler decides to migrate the task 910 from the CPU 1 to the CPU 3. First, a lock of a run queue of the CPU 1, in which the task 910 is stored, is acquired. Then, unlike in FIG. 4, where the lock of the run queue of the CPU 3, to which the task is to be migrated, is acquired, the current embodiment acquires a lock of a migration queue of the CPU 3. Here, the scheduler determines to migrate the task 920 from the CPU 2 to the CPU 3. Similar to the case of the task 910, a lock of a run queue of the CPU 2, in which the task 920 is stored, is acquired, and then an attempt is made to acquire a lock of a migration queue of the CPU 3, to which the task 920 is to be migrated. However, the lock of the migration queue of the CPU 3 is already acquired for the task 910, when the scheduler tries to acquire the lock of the migration queue of the CPU 3 for the task 920. Accordingly, the task 920 should wait in operation 940 until the lock of the migration queue of the CPU 3 is released. Only when the lock for the task 910 is released, can the lock for the task 920 be acquired.

The load balancing method using a migration queue in the symmetric multi-processor system according to the present invention differs from a conventional load balancing method when the scheduler tries to acquire the lock of the run queue of the CPU 3 and simultaneously migrates a predetermined task to the migration queue of the CPU 3 from the run queue of the CPU 1 or CPU 2. In FIG. 9, the scheduler can perform scheduling 1 for the run queue of the CPU 3, irrespective of the migration of the tasks 910 and 920, which are respectively assigned to the CPUs 1 and 2, to the migration queue of the CPU 3. This is because the lock of the run queue of the CPU 3 is not acquired by the migration of the task 910 and 920. That is, since only the lock of the migration queue of the CPU 3 is acquired while migrating a task, the scheduler can acquire the lock of the run queue of the CPU 3 and freely perform the scheduling 1.

In detail, the scheduling 1 starts to be performed for the run queue of the CPU 3, in which the task 930 is stored. The scheduler acquires the lock of the run queue of the CPU 3, and selects a next task to be performed. Here, a subject to perform a task is the CPU 3. When the next task is selected, the lock of the run queue of the CPU 3 is released, and context switching, where a task that is currently being performed in the CPU 3 and the selected next task are switched, is performed. Accordingly, the scheduling 1 ends. Referring to the scheduling 1 of FIG. 9, it can be seen that operation 450 of FIG. 4, wherein the scheduler waits until the lock of the run queue of the CPU 3 is released, does not exist. Thus, the scheduler can perform scheduling without any delay by using the load balancing method using a migration queue. Accordingly, the CPU 3 can immediately perform a task selected according to a scheduling policy without delay.

Meanwhile, the tasks 910 and 920 stored in the migration queue of the CPU 3 cannot be assigned to the CPU 3 by the scheduler, and thus should be migrated to the run queue of the CPU 3, so as to be scheduled by the scheduler with other tasks. In FIG. 9, when the tasks 910 and 920 stored in the migration queue of the CPU 3 are to be migrated to the run queue of the CPU 3, the lock of the run queue of the CPU 3 is acquired first, and then the lock of the migration queue of the CPU 3 is acquired. At this time, like in the case of the mutual exclusion for contention as described with reference to FIG. 6, it may be checked whether the lock of the migration queue of the CPU 3 is already acquired. In FIG. 9, it can be seen that the task 920 has been migrated to the migration queue of the CPU 3 from the run queue of the CPU 2, and the lock of the migration queue of the CPU 3 for the task 920 has been released before starting scheduling 2. Accordingly, when the scheduling 2 starts, the lock of the migration queue of the CPU 3 is acquired, and the tasks 910 and 920 in the migration queue of the CPU 3 migrates to the run queue of the CPU 3 in operation 950 by the scheduler. Then, the lock of the migration queue of the CPU 3 is released, a next task to be performed is selected, and then the lock of the run queue of the CPU 3 is released. Finally, the scheduling 2 ends by performing context switching.

Figure 4:
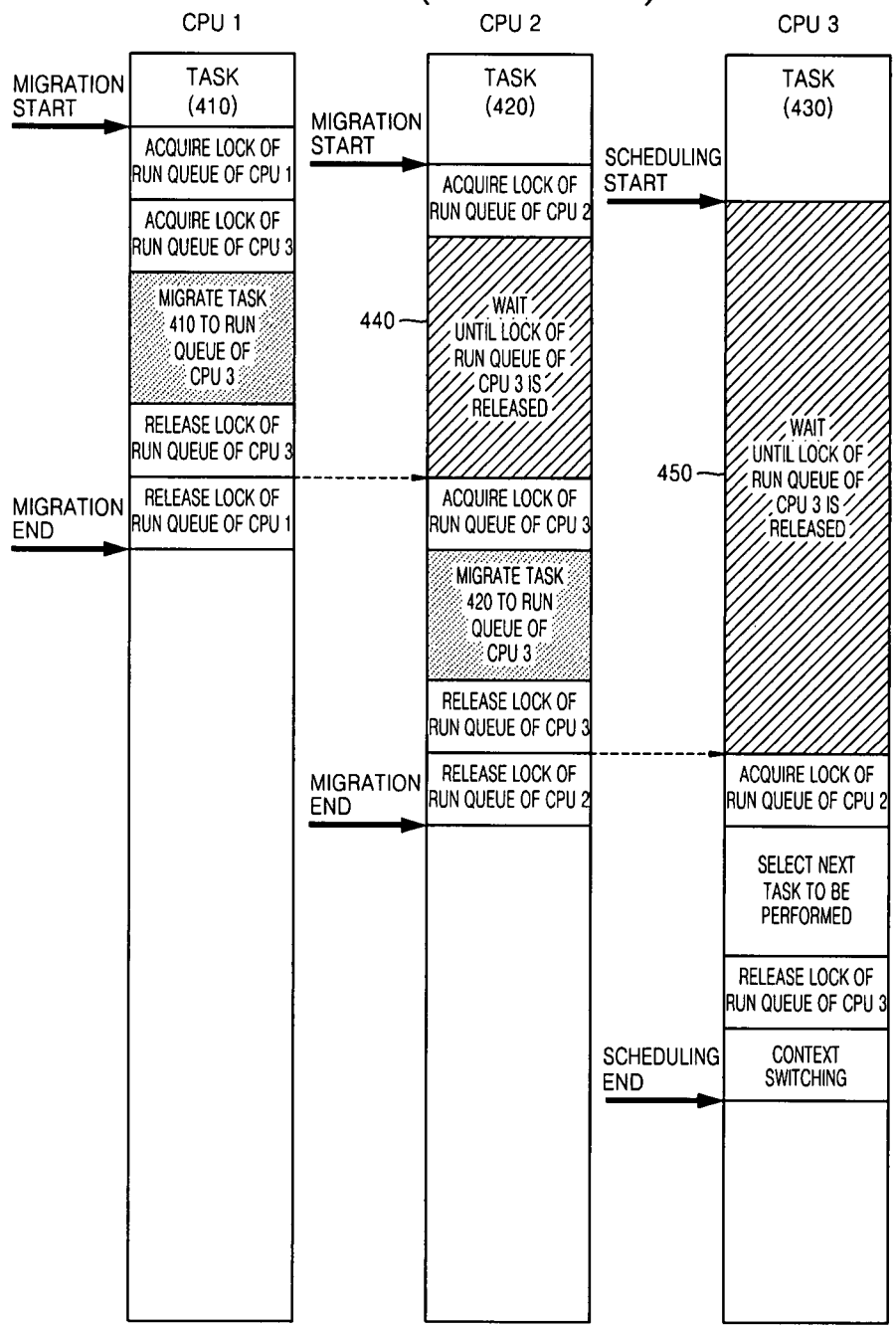
FIG. 4 is a diagram illustrating a sequence of performing tasks according to time while migrating the tasks in a conventional symmetric multi-processor system.

In FIG. 9, it is preferable to migrate all tasks 910 and 920 in the migration queue of the CPU 3 to the run queue of the CPU 3 in operation 950. In FIG. 4, the lock of the run queue of the CPU 3 is acquired twice when the tasks respectively migrate from the run queues of the CPUs 1 and 2 to the run queue of the CPU 3. However, in FIG. 9, the lock of the run queue of the CPU 3 is acquired once by migrating all tasks 910 and 920 in the migration queue of the CPU 3 to the run queue of the CPU 3 in operation 950. When there are 10 CPUs to migrate tasks for load balancing, the lock of the run queue of the CPU 3 is acquired ten times according to the embodiment of FIG. 4, but is acquired only once according to the embodiment of FIG. 9. Accordingly, a delay time required to schedule the run queue of the CPU 3 is remarkably reduced.

In order to prevent a delay in response time of each of a plurality of tasks that occur by blocking a run queue of a processor by migrating a task when load imbalance occurs in a conventional symmetric multi-processor system, and solve a problem of a long waiting time of a scheduler due to the delay in response time, a predetermined task is migrated to a migration queue instead of a run queue, and then the predetermined task is migrated to a run queue corresponding to the migration queue when the migration queue is not blocked by another task. Accordingly, in the load balancing method and the load balancing apparatus of the present invention, the run queue of the processor is not blocked while migrating the task and an immediate response is possible. Consequently, a waiting time of the scheduler reduces, and the scheduler can speedily perform the context switching, and thus overhead of the entire operating system decreases and real-time processing in an embedded system is strongly guaranteed by quickly switching tasks.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A load balancing method, comprising:
selecting a first processor, comprising a first run queue and a first migration queue, and a second processor, comprising a second run queue and a second migration queue, based on a load between a plurality of processors;
acquiring a lock on the second migration queue;
migrating a predetermined task stored in the first run queue directly to the second migration queue, as a first migration; and
migrating the predetermined task stored in the second migration queue to the second run queue, as a second migration,
wherein the first migration queue is different from the second migration queue.
2. The load balancing method of claim 1, further comprising
acquiring a lock of the second run queue,
wherein, when the lock of the second run queue is acquired, the second migration migrates all tasks stored in the second migration queue to the second run queue, and
when the second migration is completed, the method further comprises releasing the lock of the second run queue.

3. The load balancing method of claim 2, wherein when the locks of the second run queue and the second migration queue are acquired, the second migration migrates all tasks stored in the second migration queue to the second run queue, and
when the second migration is completed, the method further comprises releasing the lock of the second migration queue.
4. The load balancing method of claim 1, wherein when the lock of the second migration queue is acquired, the first migration migrates the predetermined task stored in the first run queue to the second migration queue, and
when the first migration is completed, the method further comprises releasing the lock of the second migration queue.
5. The load balancing method of claim 4, further comprising
acquiring a lock of the first run queue, wherein when the locks of the first run queue and the second migration queue are acquired, the first migration migrates the predetermined task stored in the first run queue to the second migration queue, and
when the first migration is completed, the method further comprises releasing the lock of the first run queue.
6. The load balancing method of claim 1, further comprising checking whether there is a task stored in the second migration queue,
wherein the second migration selectively migrates the task stored in the second migration queue to the second run queue according to a result of the checking.
7. The load balancing method of claim 1, further comprising checking whether the lock of the second migration queue can be acquired,
wherein the second migration selectively migrates the task stored in the second migration queue to the second run queue according to a result of the checking.
8. A non-transitory computer readable recording medium having recorded thereon a program for executing the method of any one of claims 1 through 7.
9. A symmetric multi-processor system, comprising:
a plurality of processors;
a scheduler, which selects a first processor, comprising a first run queue and a first migration queue, and a second processor, comprising a second run queue and a second migration queue, based on loads of the plurality of processors, and acquires a lock on the second migration queue;
the first run queue, which stores tasks to be performed by the first processor;
the second run queue, which stores tasks to be performed by the second processor wherein the second migration queue stores tasks migrated from the first run queue, and
wherein the scheduler migrates a predetermined task stored in the first run queue directly to the second migration queue, and migrates the task stored in the second migration queue to the second run queue, and
wherein the first migration queue is different from the second migration queue.
10. The symmetric multi-processor system of claim 9, wherein the scheduler
acquires a lock of the second run queue,
migrates all tasks stored in the second migration queue to the second run queue when the lock of the second run queue is acquired, and
releases the lock of the second run queue when all the tasks are migrated from the second migration queue to the second run queue.

11. The symmetric multi-processor system of claim 10, wherein the scheduler
    migrates all tasks stored in the second migration queue to the second run queue when the lock of the second migration queue is acquired, and
    releases the lock of the second migration queue when all the tasks are migrated from the second migration queue to the second run queue.

12. The symmetric multi-processor system of claim 9, wherein the scheduler
    migrates the predetermined task stored in the first run queue when the lock of the second migration queue is acquired, and
    releases the lock of the second migration queue when the task is migrated from the first run queue to the second migration queue.

13. The symmetric multi-processor system of claim 12, wherein the scheduler
    acquires a lock of the first run queue,
    migrates the task stored in the first run queue to the second migration queue when the locks of the first run queue and the second migration queue are acquired, and
    releases the lock of the first run queue when the task is migrated from the first run queue to the second migration queue.

14. The symmetric multi-processor system of claim 9, wherein the scheduler
    checks whether there is a task stored in the second migration queue, and
    selectively migrates the task stored in the second migration queue to the second run queue based on a result of the checking.

15. The symmetric multi-processor system of claim 9, wherein the scheduler
    checks whether the lock of the second migration queue can be acquired, and
    selectively migrates the task stored in the second migration queue to the second run queue based on a result of the checking.

16. A load balancing method, comprising:
    selecting a first processor, comprising a first run queue and a first migration queue, and a second processor, comprising a second run queue and a second migration queue, based on a load between a plurality of processors;
    acquiring a lock on the second migration queue;
    migrating a predetermined task stored in the first run queue directly to the second migration queue, as a first migration; and
    migrating the predetermined task stored in the second migration queue to the second run queue, as a second migration,
    wherein the first migration queue comprises a queue which obtains a task from the second run queue and transmits the task to the first run queue; and
    wherein the first migration queue is different from the second migration queue.

* * * * *

UNITED STATES PATENT AND TRADEMARK OFFICE
CERTIFICATE OF CORRECTION

| | |
|---|---|
| PATENT NO. | : 8,875,151 B2 |
| APPLICATION NO. | : 11/976759 |
| DATED | : October 28, 2014 |
| INVENTOR(S) | : Gyu-sang Choi et al. |

It is certified that error appears in the above-identified patent and that said Letters Patent is hereby corrected as shown below:

In the Claims

Column 10, line 51, in Claim 9, delete "processor" and insert -- processor, --, therefor.

Signed and Sealed this
Nineteenth Day of May, 2015

Michelle K. Lee
*Director of the United States Patent and Trademark Office*